(12) United States Patent
Takei et al.

(10) Patent No.: US 8,664,949 B2
(45) Date of Patent: Mar. 4, 2014

(54) RESOLVER AND RESOLVER-ROLLING BEARING UNIT

(75) Inventors: Tomoyuki Takei, Nara (JP); Kouji Kitahata, Minamikawachi-gun (JP); Toshiki Kumeno, Kyoto (JP); Takashi Matsumoto, Kariya (JP)

(73) Assignee: Jtekt Corporation, Osaka-Shi (JP)

( * ) Notice: Subject to any disclaimer, the term of this patent is extended or adjusted under 35 U.S.C. 154(b) by 159 days.

(21) Appl. No.: 13/357,064

(22) Filed: Jan. 24, 2012

(65) Prior Publication Data

US 2012/0206131 A1 Aug. 16, 2012

(30) Foreign Application Priority Data

Feb. 14, 2011 (JP) ................................. 2011-028935
Oct. 13, 2011 (JP) ................................. 2011-225738

(51) Int. Cl.
*G01B 7/30* (2006.01)
(52) U.S. Cl.
USPC .................................................. 324/207.25
(58) Field of Classification Search
USPC .................................................. 324/207.25
See application file for complete search history.

(56) References Cited

U.S. PATENT DOCUMENTS

| 6,979,001 | B2 | 12/2005 | Ohtsuki et al. | |
|---|---|---|---|---|
| 2006/0087315 | A1* | 4/2006 | Inoue et al. | 324/207.25 |
| 2006/0186627 | A1* | 8/2006 | Koyagi et al. | 280/93.512 |
| 2008/0024021 | A1 | 1/2008 | Tsukashima et al. | |

FOREIGN PATENT DOCUMENTS

| JP | A-2006-090511 | 4/2006 |
|---|---|---|
| JP | A-2007-336714 | 12/2007 |

OTHER PUBLICATIONS

Sep. 10, 2013 Extended European Search Report issued in European Patent Application No. 12155075.0.

* cited by examiner

*Primary Examiner* — Bot Ledynh
(74) *Attorney, Agent, or Firm* — Oliff PLC (57) ABSTRACT

A resolver includes: a resolver rotor attached to a rotational shaft; an annular resolver stator that is provided on a radially outer side of the resolver rotor and that has a plurality of teeth each opposed, across a clearance, to an outer peripheral face of the resolver rotor and circumferentially arranged at given intervals; and a case member having a cylindrical fit portion to which an outer peripheral face of the resolver stator is fitted. At least three protrusions, each protruding radially outward, are formed at given circumferential intervals on the outer peripheral face of the resolver stator, so that the outer peripheral face of the resolver stator is press-fitted to an inner peripheral face of the fit portion at positions at which the protrusions are formed.

20 Claims, 10 Drawing Sheets

RESOLVER AND RESOLVER-ROLLING BEARING UNIT

INCORPORATION BY REFERENCE

The disclosures of Japanese Patent Applications No. 2011-028935 filed on Feb. 14, 2011 and No. 2011-225738 filed on Oct. 13, 2011 including the specifications, drawings and abstracts, are incorporated herein by reference in their entireties.

BACKGROUND OF THE INVENTION

1. Field of the Invention

The invention relates to a resolver used to detect the rotation angle (rotational position) of a rotational shaft of a motor, or the like, and relates also to a resolver-rolling bearing unit.

2. Description of Related Art

A resolver is one type of angle detection devices for detecting the rotation angle (rotational position) of a rotational shaft, and includes a resolver stator and a resolver rotor. A resolver stator is an annular member having, at its inner peripheral face, a plurality of teeth (tooth portions) which are arranged at given intervals in the circumferential direction of the resolver stator. A coil is wound around each tooth. A resolver rotor is disposed on the radially inner side of the resolver stator with a clearance formed between the resolver stator and the resolver rotor, and is attached to a rotational shaft so as to be rotatable together with the rotational shaft (for example, refer to Japanese Patent Application Publications No. 2006-90511 and No. 2007-336714).

In a resolver described in Japanese Patent Application Publication No. 2006-90511, a resolver stator is press-fitted at its outer peripheral face to the inner peripheral face of a cylindrical case. With this structure, however, if there is a distortion or dimensional variation at a part of the inner peripheral face of the case, the radial positions of some of teeth formed at the inner peripheral face of the resolver stator may change. This may raise a possibility that a clearance between the resolver stator and a resolver rotor will not be appropriately set.

Japanese Patent Application Publication No. 2006-90511 (refer especially to FIG. 2) describes a resolver-rolling bearing unit. In this resolver-rolling bearing unit, a press-fit cylindrical portion is formed at an axial end of an outer ring of a rolling bearing, and the case is press-fitted, at its outer peripheral face, to the inner peripheral face of the press-fit cylindrical portion. Thus, the rolling bearing is fixed to the case. In this structure, the position of the press-fit cylindrical portion of the outer ring and the position of the resolver stator substantially overlap each other in the axial direction. Therefore, a distortion or the like, which is caused at the case when the case is press-fitted to the press-fit cylindrical portion of the outer ring, may directly affect the resolver stator. This may raise a possibility that a clearance between the resolver stator and the resolver rotor will not be appropriately set. Further, the outer ring is fixed to a housing of a motor, or the like, by fitting. If the housing thermally expands more than the outer ring does due to the use under a high-temperature environment, the interference of the outer ring is reduced. This may raise a possibility that the outer ring will run idle in the housing. This idle running may cause, for example, wear of the housing.

In a resolver described in Japanese Patent Application Publication No. 2007-336714, a resolver stator and a resolver rotor are provided as individual parts, and a rolling bearing that rotatably supports a rotational shaft is provided as an individual part that is separated from the resolver stator and the resolver rotor. The resolver stator, the resolver rotor, and the rolling bearing are attached to a housing of a motor, or the like, and the rotational shaft, individually. Therefore, handling each part of the resolver and each part of the rolling bearing is cumbersome, and attaching the resolver and the rolling bearing to the housing and the rotational shaft is also cumbersome. This may make it difficult to ensure a high accuracy in each assembly work, such as centering of each part.

SUMMARY OF THE INVENTION

It is an object of the invention to provide a resolver and a resolver-rolling bearing unit that make it possible to attach a resolver stator to a case member with almost no influence of a distortion of the case member, thereby appropriately setting a clearance between each tooth of the resolver stator and a resolver rotor.

An aspect of the invention relates to a resolver including a resolver rotor, an annular resolver stator, and a case member. The resolver rotor is attached to a rotational shaft. The resolver stator is provided on a radially outer side of the resolver rotor, and has a plurality of teeth each opposed, across a clearance, to an outer peripheral face of the resolver rotor and circumferentially arranged at given intervals. The case member has a cylindrical fit portion to which an outer peripheral face of the resolver stator is fitted. At least three protrusions, each protruding radially outward, are formed at given circumferential intervals on the outer peripheral face of the resolver stator, so that the outer peripheral face of the resolver stator is press-fitted to an inner peripheral face of the fit portion at positions at which the protrusions are formed.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
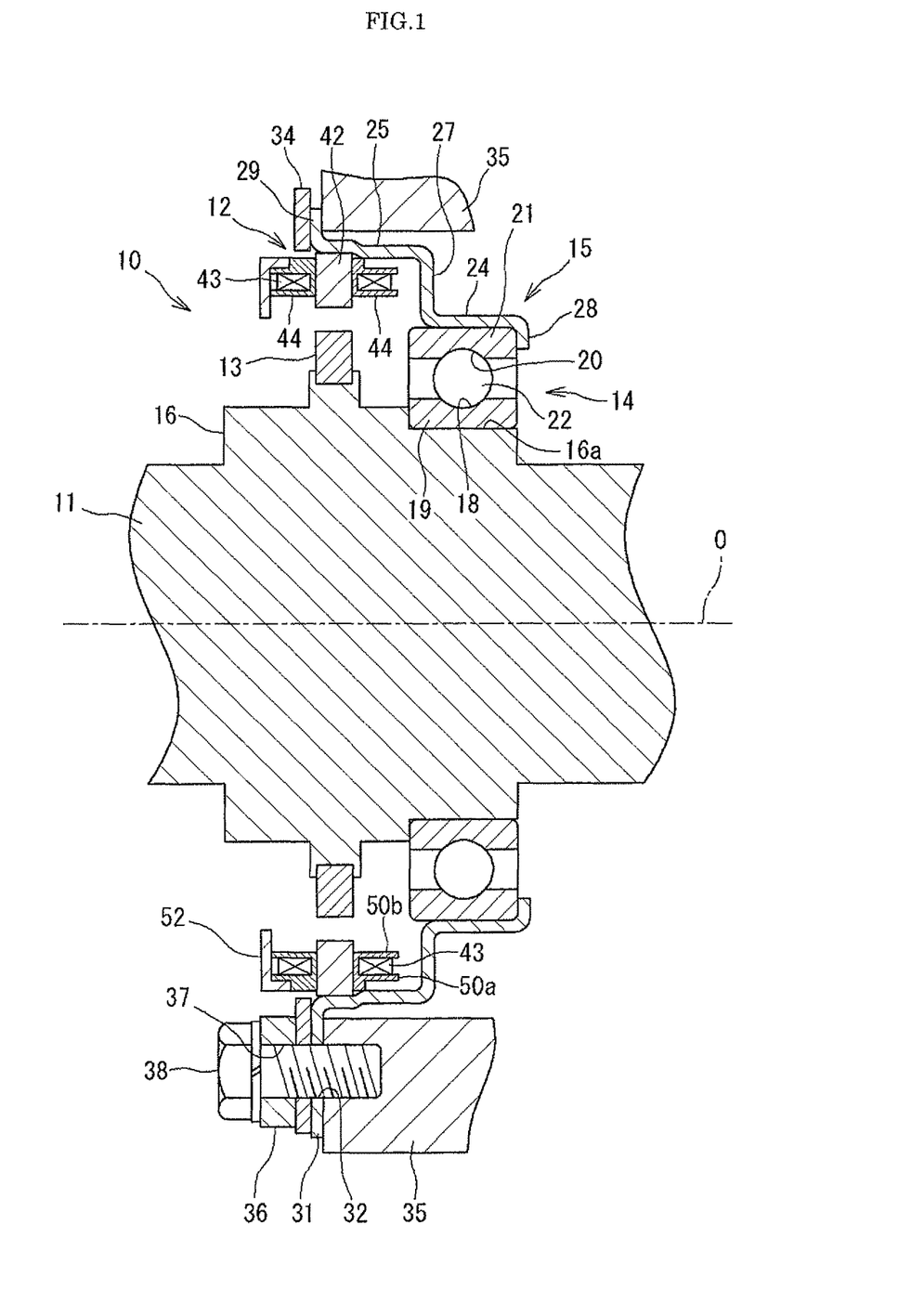
FIG. 1 is a sectional side view showing a resolver according to a first example embodiment of the invention.

Hereinafter, example embodiments of the invention will be described with reference to the drawings. FIG. 1 is a sectional side view showing a resolver 10 according to a first example embodiment of the invention. The resolver 10 according to the first example embodiment is used, for example, to detect the rotation angle (rational position) of a rotational shaft 11 of a motor generator used in a hybrid vehicle. The resolver 10 includes a resolver stator 12 and a resolver rotor 13. The resolver 10 according to the first example embodiment constitutes a part of a resolver-rolling bearing unit that also includes a rolling bearing 14 that rotatably supports the rotational shaft 11. The rolling bearing 14 and the resolver stator 12 are assembled together via a case member 15 into one unit.

As shown in FIG. 1, the rolling bearing 14 includes an inner ring 19 having an inner raceway 18, an outer ring 21 having an outer raceway 20, and a plurality of rolling elements 22. The outer ring 21 is provided on the radially outer side of the inner ring 19 so as to be concentric with the inner ring 19. The rolling elements 22 are rollably arranged between the inner raceway 18 and the outer raceway 20. More specifically, in the first example embodiment, the rolling elements 22 are balls, that is, the rolling bearing 14 is a ball bearing. The outer ring 21 of the rolling bearing 14 is fixed to the case member 15, and the inner ring 19 is fixed to an attachment portion 16 formed integrally with the rotational shaft 11.

Figure 2:
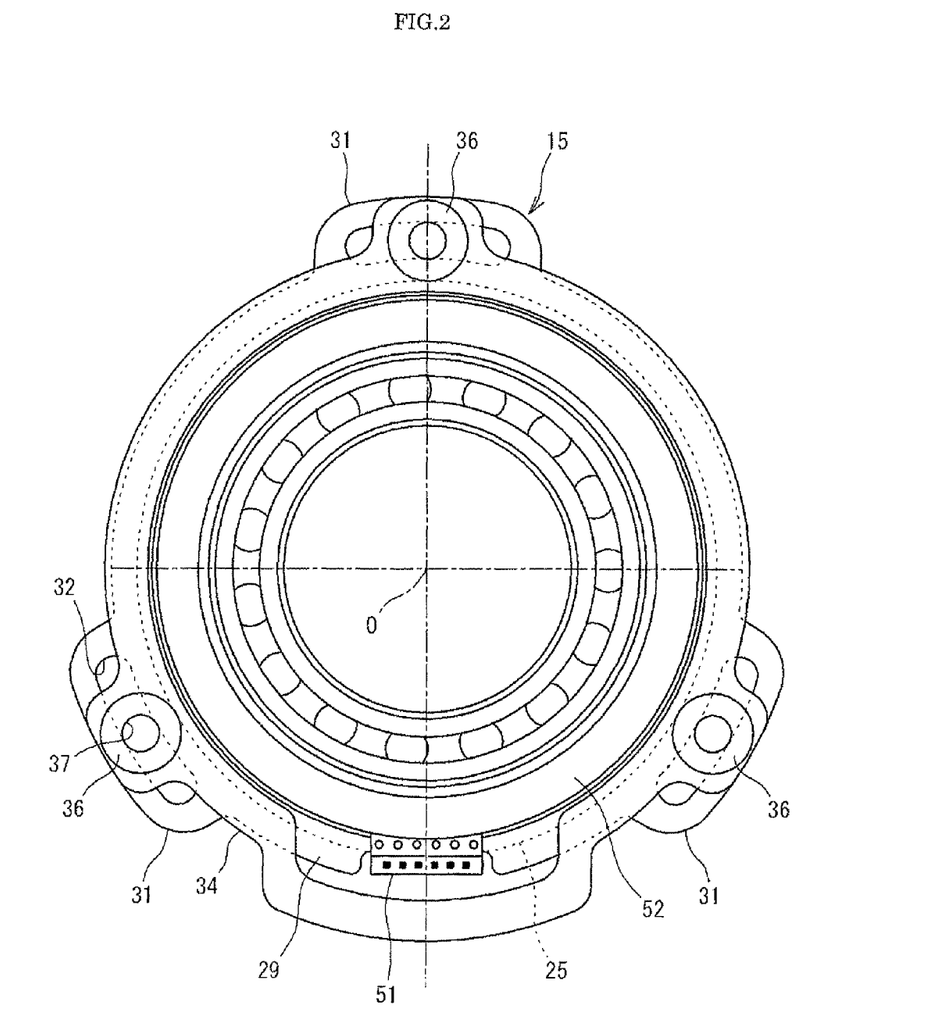
FIG. 2 is a front view showing a part of the resolver according to the first example embodiment of the invention.
Figure 3:
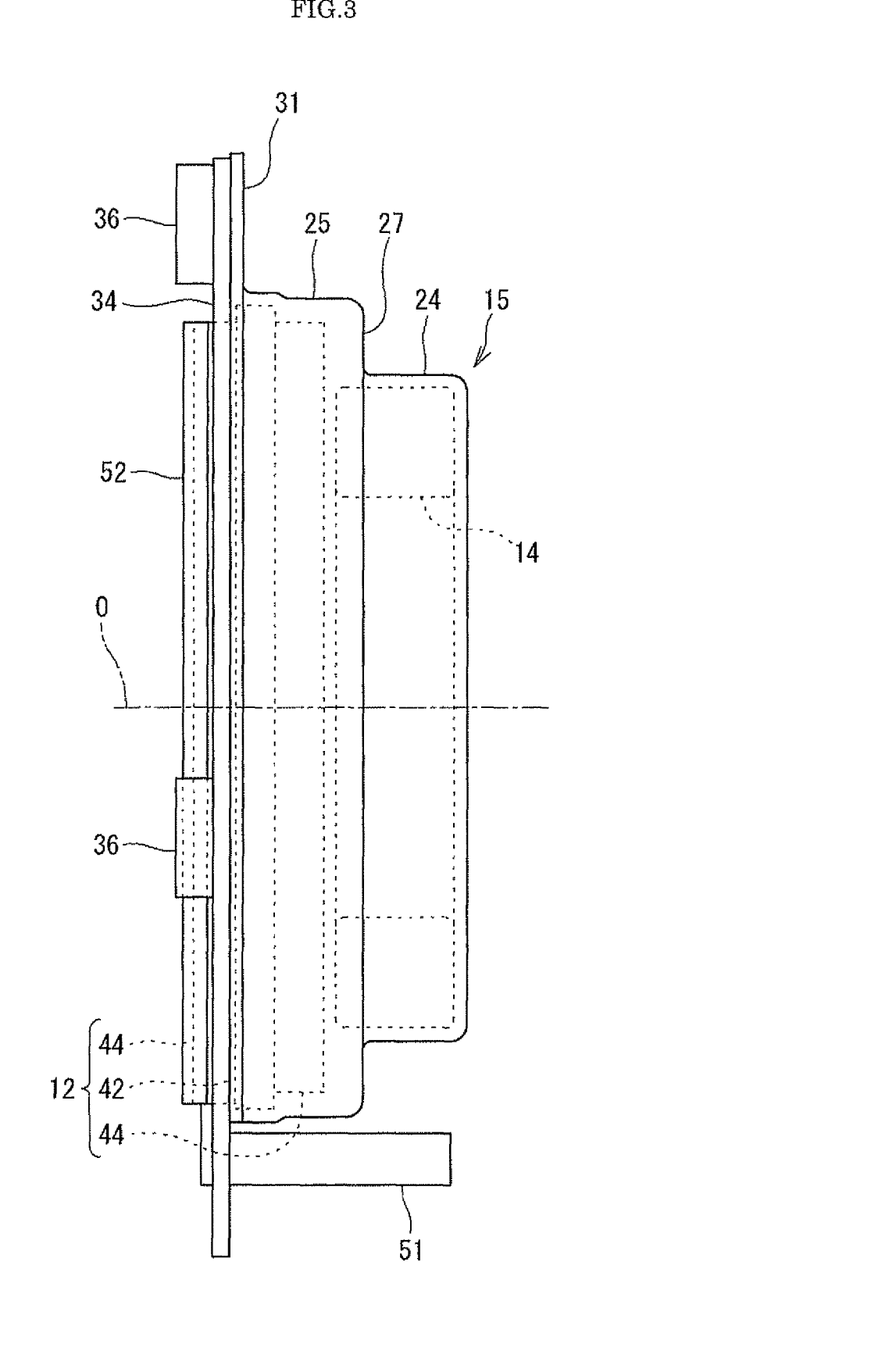
FIG. 3 is a side view showing a part of the resolver according to the first example embodiment of the invention.
Figure 4:
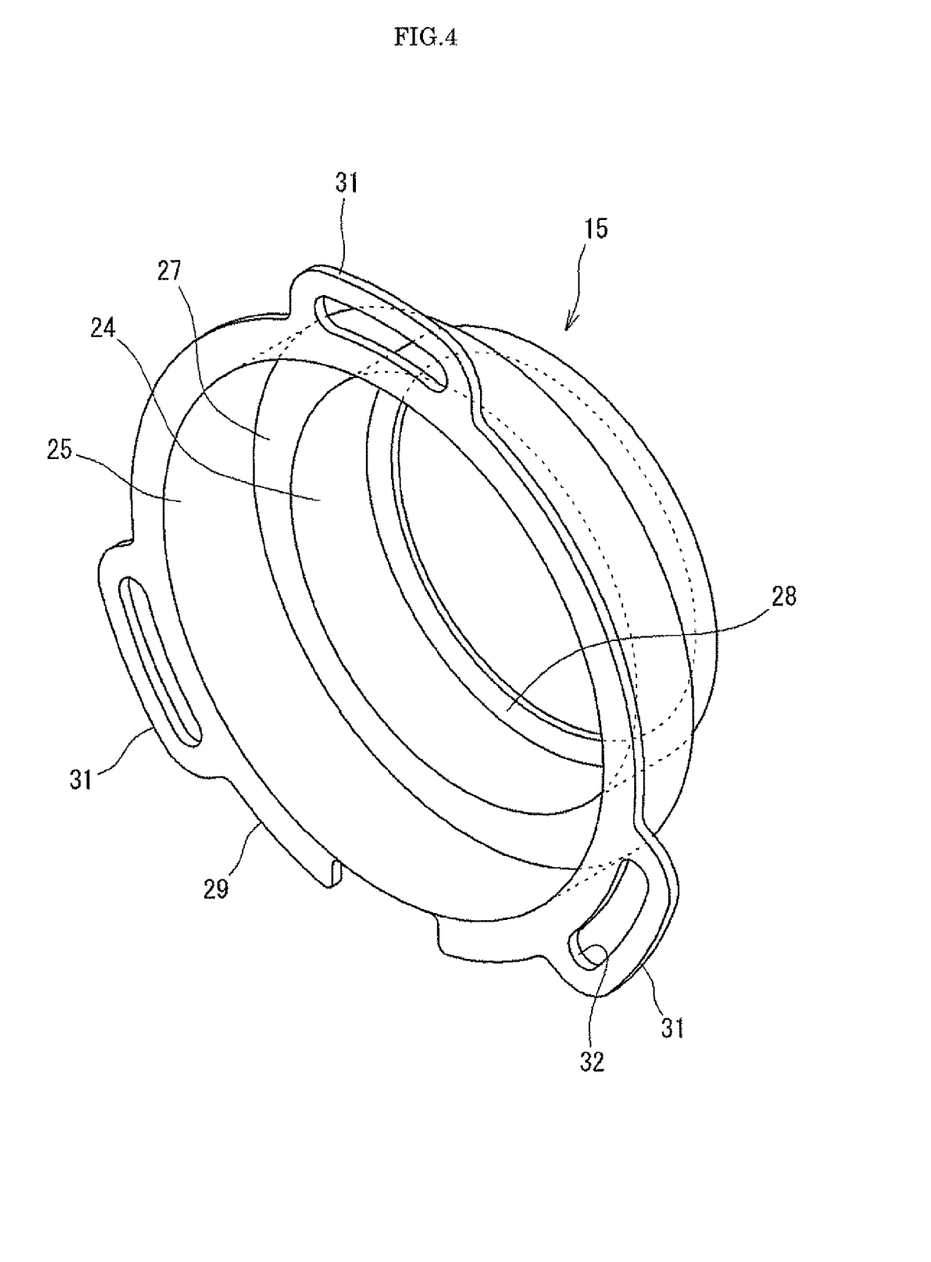
FIG. 4 is a perspective view of a case member according to the first example embodiment of the invention.

FIG. 2 is a front view showing a part of the resolver 10 (showing the structure of the resolver 10 excluding the resolver rotor 13). FIG. 3 is a side view showing a part of the resolver 10 (showing the structure of the resolver 10 excluding the resolver rotor 13). FIG. 4 is a perspective view of the case member 15. As shown in FIGS. 1 to 4, the case member 15 has an outer ring attachment portion 24 to which the outer ring 21 of the rolling bearing 14 is attached, and a fit portion 25 to which the resolver stator 12 is fitted. The outer ring attachment portion 24 is cylindrical, and the outer ring 21 is press-fitted, at its outer peripheral face, to the inner peripheral face of the outer ring attachment portion 24, so that the outer ring 21 is fitted to the outer ring attachment portion 24 and fixed in its position. The fit portion 25 is also cylindrical, and the resolver stator 12 is press-fitted, at its outer peripheral face, to the fit portion 25, so that the resolver stator 12 is fitted to the fit portion 25 and fixed in its position.

The outer ring attachment portion 24 is smaller in diameter than the fit portion 25. Formed between the outer ring attachment portion 24 and the fit portion 25 is an annular plate portion 27 extending radially from the outer ring attachment portion 24 to the fit portion 25. An inner rib portion 28, extending radially inward, is formed at an axial end of the outer ring attachment portion 24 (i.e., an end of the outer ring attachment portion 24, which is on the axially opposite side of the outer ring attachment portion 24 from the fit portion 25 (the right end of the outer ring attachment portion 24 as viewed in FIG. 1)).

An outer rib portion 29, extending radially outward, is formed at the other axial end of the fit portion 25 (i.e., an end of the fit portion 25, which is on the axially opposite side of the fit portion 25 from the outer ring attachment portion 24 (the left end of the fit portion 25 as viewed in FIG. 1)). The outer ring attachment portion 24, the fit portion 25, the annular plate portion 27, the inner rib portion 28, and the outer rib portion 29 are formed by subjecting a single metal plate to a plastic forming process (e.g., pressing (squeezing)). The inner rib portion 28 is formed by bending one end portion of the metal plate such that the inner rib portion 28 extends radially inward. The outer rib portion 29 is formed by bending the other end portion of the metal plate such that the outer rib portion 29 extends radially outward.

The inner rib portion 28 serves as a restricting portion that restricts the axial position of the outer ring 21 fitted to the outer ring attachment portion 24. The outer rib portion 29 is formed over almost the entire circumference of the fit portion 25, more specifically, over the entire circumference of the fit portion 25 except where a connector portion 51, which will be described later, is provided (refer to FIG. 2). The outer rib portion 29 serves as a rib that reinforces the fit portion 25 from the radially outer side. Further, multiple flange portions (attachment portions) 31, each extending radially outward, are equiangularly formed on the outer rib portion 29. It is to be noted that three flange portions 31 are formed in this example embodiment as shown in FIGS. 2 and 4. An elongated hole 32 having a shape of an arc extending about an axis O is formed in each of the flange portions 31.

As shown in FIG. 1, the case member 15 is attached to a housing 35 of for example, the motor generator with the use of a fastening ring 34. As shown in FIG. 2, the fastening ring 34 has a plurality of boss portions 36 (three boss portions 36 are formed in this example embodiment) that are equiangularly arranged. A bolt hole 37 is formed in each boss portion 36. The fastening ring 34 is placed on the flange portions 31 of the case member 15, and then bolts 38 are inserted into the bolt holes 37 and the elongated holes 32 and then screwed into the housing 35. In this way, the case member 15 is fixed to the housing 35. The circumferential position of the case member 15 is adjustable within the range corresponding to the length of each elongated hole 32. It is to be noted that the fastening ring 34 is not necessarily used, that is, the flange portions 31 may be directly bolted to the housing 35 if appropriate.

As shown in FIG. 1, the attachment portion 16 is formed integrally with the rotational shaft 11. The attachment portion 16 protrudes radially outward from the outer peripheral face of the rotational shaft 11. An inner ring attachment portion 16a is formed at an axial end of the attachment portion 16. The inner ring 19 is press-fitted to the inner ring attachment portion 16a. The resolver rotor 13 is fixed to an axially intermediate portion of the attachment portion 16. It is to be noted that the attachment portion 16 may be provided as a member separate from the rotational shaft 11. In this case, for example, the attachment portion 16 is a cylindrical member made of a metallic material, a synthetic resin material, etc., and is fitted to the outer peripheral face of the rotational shaft 11 such that the attachment portion 16 is rotatable together with the rotational shaft 11.

Figure 5:
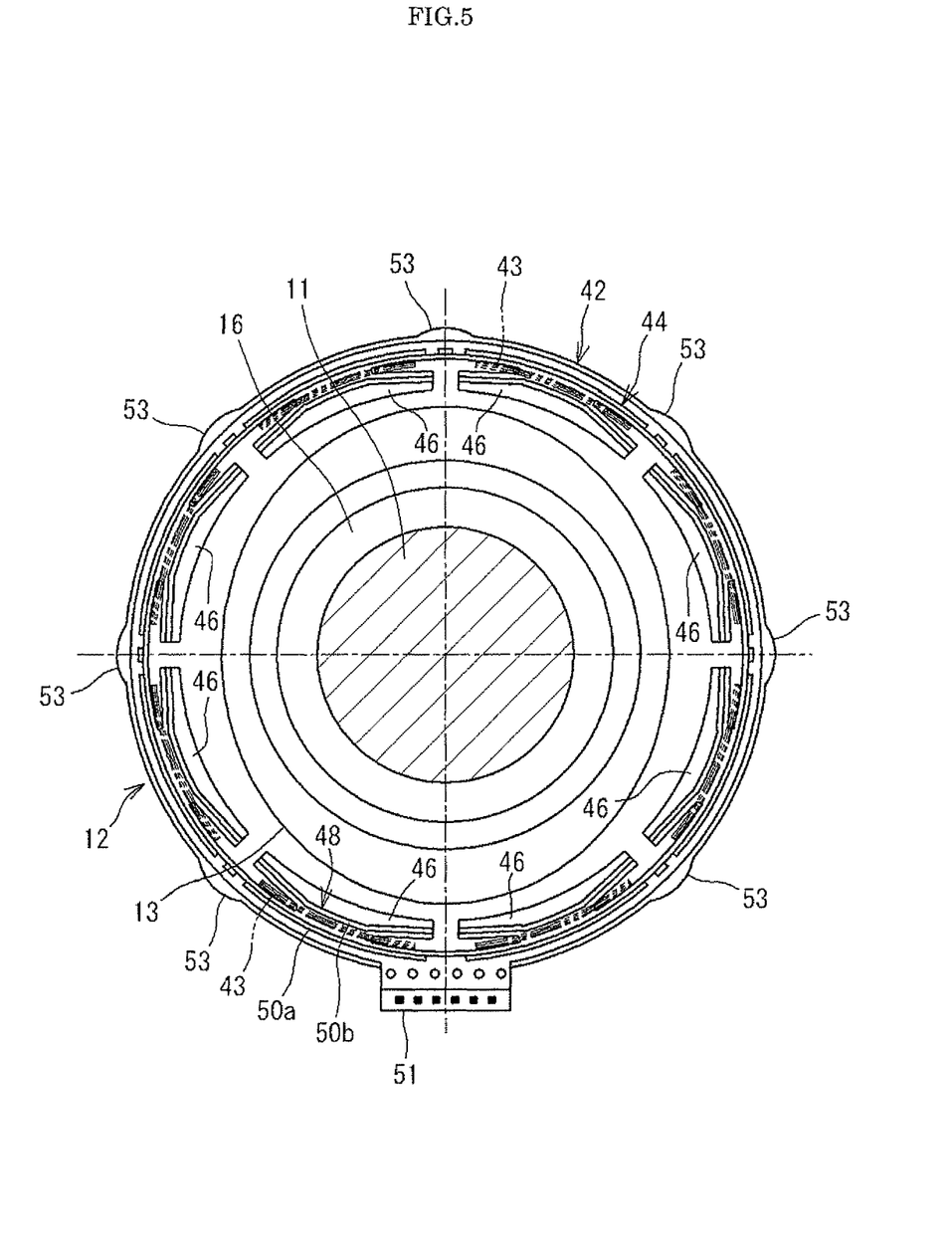
FIG. 5 is a front view showing a resolver stator and a resolver rotor according to the first example embodiment of the invention.
Figure 6:
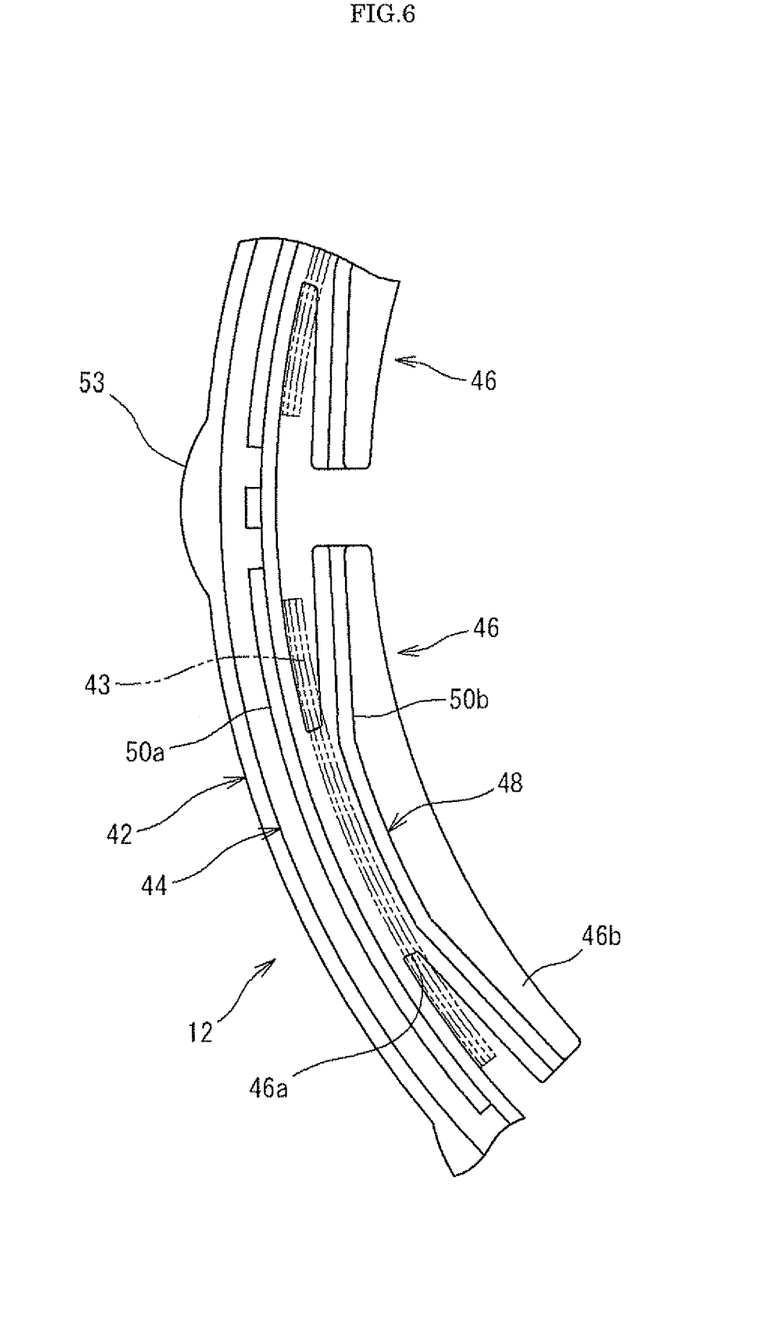
FIG. 6 is an enlarged front view showing a part of the resolver stator according to the first example embodiment of the invention.
Figure 7:
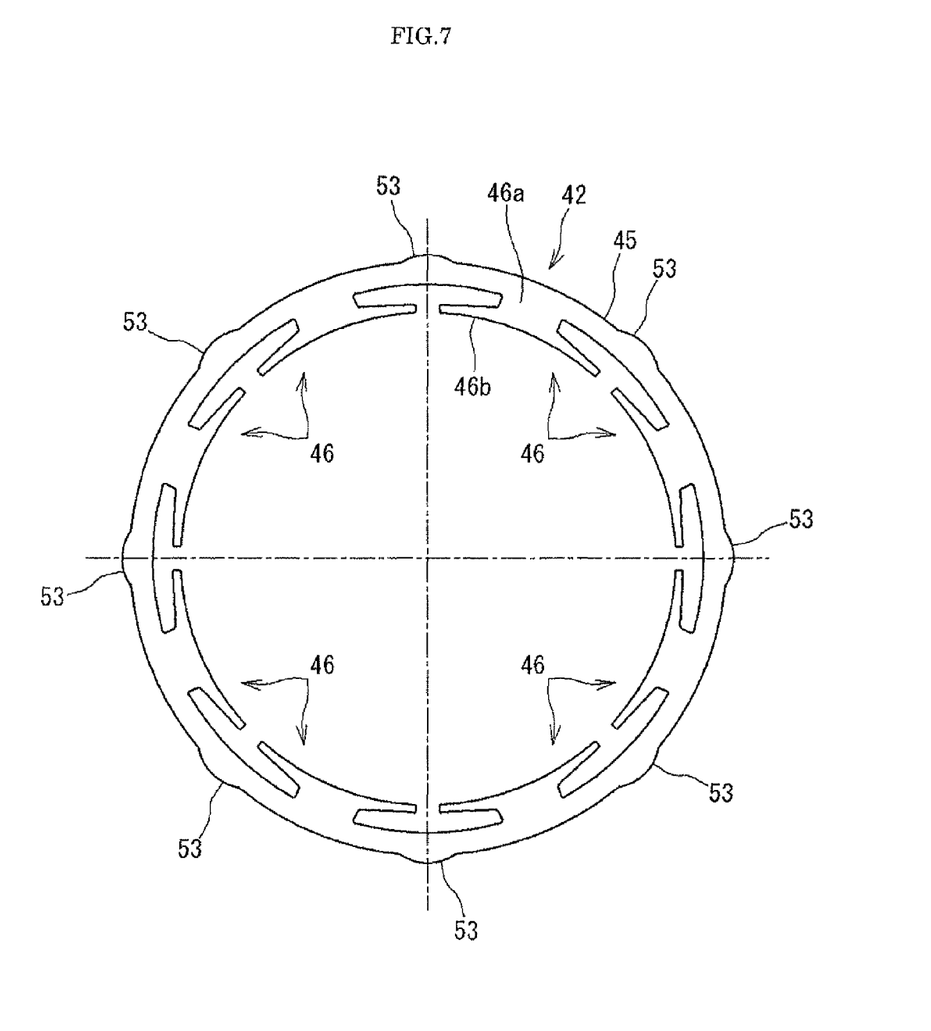
FIG. 7 is a front view showing a stator core according to the first example embodiment of the invention.

FIG. 5 is a front view showing the resolver stator 12 and the resolver rotor 13. FIG. 6 is an enlarged front view showing a part of the resolver stator 12. The resolver stator 12 is an annular member having a stator core 42, coils 43, and insulators 44. FIG. 7 is a front view of the stator core 42. The stator core 42 is made of a magnetic material, such as a single-layer silicon steel plate and a multi-layer silicon steel plate. The stator core 42 is a single piece member having an annular portion 45 and a plurality of teeth 46 (eight teeth 46 are formed in this example embodiment). The teeth 42 each protrude radially inward from the inner peripheral face of the annular portion 45. The teeth 42 are equiangularly arranged. Each tooth 46 has a base portion 46a and an end portion 46b. The base portion 46a is smaller in circumferential length than the end portion 46b. The end portion 46b is circumferentially wide, extending on the both circumferential sides from the base portion 46a. The coils 43 are wound around the base portions 46a of the respective teeth 46. It is to be noted that the coils 43 include those used for excitation and those used for output detection, and the former coils 43 will be referred to as "the excitation coils 43" where necessary, while the latter coils 43 will hereinafter be referred to as "the output coils 43" where necessary.

As shown in FIG. 5, the insulators 44 are each an annular member made of an insulating material, such as a synthetic resin. The insulators 44 are, as shown in FIG. 1, arranged on the respective axial sides of the stator core 42, and have, as shown in FIG. 6, coating portions 48 that coat the respective teeth 46 of the stator core 42. The coating portions 48 insulate the teeth 46 from the respective coils 43.

Each coating portion 48 of the insulator 44 has a pair of wall portions 50a and 50b that are radially arranged. The coil 43 is wound around the tooth 46 at a position between the paired wall portions 50a and 50b. The connector portion 51 having terminals to which the coils 43 are connected is formed at one of the insulators 44, that is, the one arranged on one axial side of the stator core 42 (refer to FIG. 5). A cover member 52, which is annular, is attached to the axial end of this insulator 44, such that the cover member 52 covers the coils 43 from the axially outer side (refer to FIGS. 1 to 3).

As shown in FIG. 5, the resolver rotor 13 is generally oval as viewed from its front side (i.e., as viewed axially). The outer peripheral face of the resolver rotor 13 is opposed, across a given clearance, to each tooth 46 of the resolver stator 12. As the rotational shaft 11 rotates, the resolver rotor 13 rotates together with the rotational shaft 11, whereby the clearance between each tooth 46 of the resolver stator 12 and the resolver rotor 13 changes. If each excitation coil 43 of the resolver stator 12 is energized with an alternating current during rotation of the rotational shaft 11 (the resolver rotor 13), the output coils 43 each output a signal corresponding to a change in the clearance described above, and the rotation angle of the rotational shaft 11 is detected based on these output signals. The excitation coils 43 are provided at all the teeth 46. The output coils 43 include SIN output coils 43 and COS output coils 43. The SIN output coils 43 and the COS output coils 43 are alternately provided, in the circumferential direction, at the respective teeth 46. The difference between the phase of the alternating current voltage output from each SIN output coil 43 and the phase of the alternating current voltage output from the COS output coil 43 corresponding to this SIN output coil 43 is 90 degrees. The rotation angle of the rotational shaft 11 is detected by subjecting these output voltages to a given signal processing(s).

Figure 8:
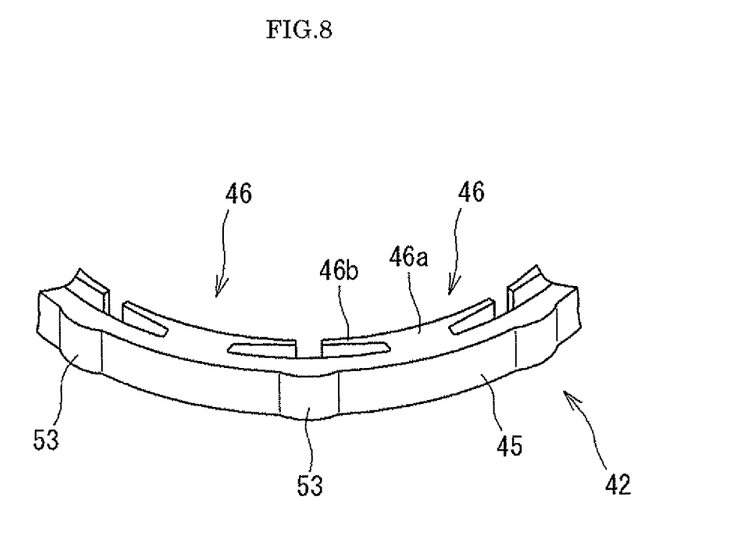
FIG. 8 is a perspective view showing a part of the stator core according to the first example embodiment of the invention.

FIG. 8 is a perspective view of a part of the stator core 42. As shown in FIGS. 7 and 8, multiple protrusions 53 are equiangularly formed on the outer peripheral face of the stator core 42 of the resolver stator 12. Each protrusion 53 is formed in the shape of an arc of which the radius is smaller than the radius of the stator core 42 as measured at its outer peripheral face excluding where the protrusions 53 are formed. In the first example embodiment, the number of the protrusions 53 is eight, that is, the number of the protrusions 53 of the stator core 42 is the same as the number of the teeth 46. Each protrusion 53 is formed at a circumferential position that corresponds to the position between the consecutive teeth 46. It appears in FIGS. 7 and 8 that each protrusion 53 largely protrudes radially outward in order to facilitate the understanding on the shape of the protrusions 53. However, the actual protrusions 53 only slightly protrude from the outer peripheral face of the stator core 42.

As shown in FIG. 1, the stator core 42 is fixed in its position by being fitted, at its outer peripheral face, to the inner peripheral face of the fit portion 25 of the case member 15. More specifically, due to the protrusions 53 formed on the outer peripheral face of the stator core 42, the stator core 42 is press-fitted to the fit portion 25 of the case member 15 by being interference-fitted to the fit portion 25 at the positions at which the respective protrusions 53 are formed. The outer peripheral face of the stator core 42 excluding the protrusions 53 is fitted to the fit portion 25 by being clearance-fitted to the fit portion 25. Thus, the protrusions 53 provide interferences against the fit portion 25.

When the protrusions 53 are not formed on the outer peripheral face of the stator core 42 and the stator core 42 is press-fitted, at its entire outer peripheral face, to the fit portion 25, if a distortion or a dimensional deviation occurs at a part of the inner peripheral face of the fit portion 25, the radial position(s) of the tooth(teeth) 46 of the stator core 42 that is located at that part of the inner peripheral face of the fit portion 25 changes. Thus, it is not possible to appropriately set the clearance between the tooth(s) 46 and the resolver rotor 13. This makes it difficult to accurately detect the rotation angle of the rotational shaft 11. That is, the roundness of the inner peripheral face of the fit portion 25 is impaired, which causes an inconvenience. That is, the accuracy of rotation angle detection is greatly affected. According to the first example embodiment, in contrast, because only the portions where the protrusions 53 are formed, among all the portions of the outer peripheral face of the stator core 42, are press-fitted to the fit portion 25, the possibility of the inconvenience described above is low.

In the first example embodiment, each protrusion 53 is formed at a circumferential position corresponding to the position between the consecutive teeth 46. Thus, even when the stator core 42 is pressed radially inward by the inner peripheral face of the fit portion 25, there is almost no possibility that the radial positions of the respective teeth 46 will change. Therefore, an appropriate clearance is formed between each tooth 46 and the resolver rotor 13, which makes it possible to achieve a sufficiently high accuracy in the rotation angle detection. The radial thickness of the stator core 42 is small at the portions between the teeth 46, and therefore these portions tend to elastically deform radially. Therefore, even if there is a distortion or dimensional deviation at the inner peripheral portion of the fit portion 25 as mentioned earlier, the distortion or dimensional deviation is be effectively absorbed, and thus the stator core 42 is more securely fitted to the fit portion 25.

In the first example embodiment, the rigidity of the fit portion 25 is high due to the outer rib portion 29 formed at the outer periphery of the fit portion 25, which allows the fit portion 25 to bear a sufficiently large press-fit load of the stator core 42 (i.e., the load with which the fit portion 25 fastens the stator core 42). Further, forming the outer rib portion 29 at the outer periphery of the fit portion 25 contributes to an increase in dimensional accuracy of the case member 15, which is formed by pressing, especially an increase in dimensional accuracy of the fit portion 25.

Further, because the case member 15 has the annular plate portion 27 that is formed between the fit portion 25 and the outer ring attachment portion 24, the fitting of the resolver stator 12 to the fit portion 25 and the fitting of the outer ring 21 to the outer ring attachment portion 24 do not interfere with each other. For example, even when a distortion or the like occurs at the outer ring attachment portion 24 due to fitting of the outer ring 21 to the outer ring attachment portion 24, the fit portion 25 is hardly affected by the distortion or the like. Therefore, there is almost no possibility that the clearance between each tooth 46 of the resolver stator 12 and the resolver rotor 13 will become inappropriate.

Further, because the outer ring attachment portion 24, the fit portion 25, the annular plate portion 27, the inner rib portion 28, and the outer rib portion 29, which constitute the case member 15, are formed manufactured by pressing, the case member 15 is easily manufactured. Further, because the resolver stator 12 of the resolver 10 according to the first example embodiment and the rolling bearing 14 are assembled together (i.e., they are assembled into a single unit) via the case member 15, the resolver 10 and the rolling bearing 14 are easily handled and easily attached to the housing 35 and the rotational shaft 11, respectively, as compared to a case where the resolver stator 12, the rolling bearing 14, and the case member 15 are provided as parts separate from each other. That is, assembling the resolver stator 12 and the rolling bearing 14 into a singe unit makes it possible to more precisely center the resolver stator 12 and the rolling bearing 14 such that their axes coincide with each other. As a result, the resolver stator 12 is more accurately set in its position relative to the rotational shaft 11 attached to the rolling bearing 14 and to the resolver rotor 13 attached to the rotational shaft 11.

Figure 9:
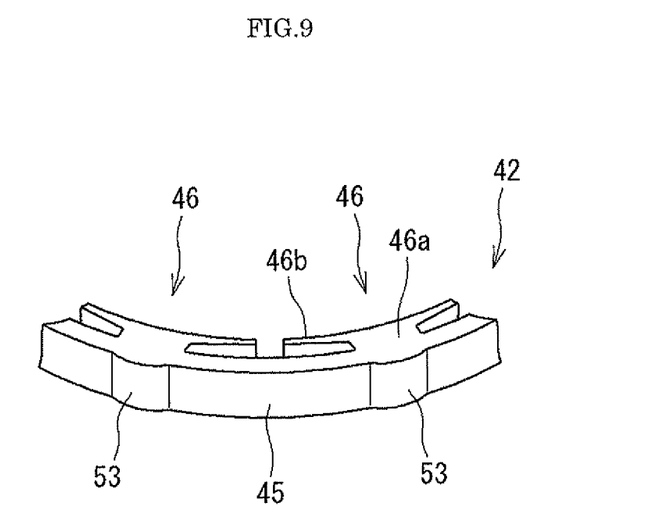
FIG. 9 is a perspective view showing a part of a stator core according to a second example embodiment of the invention.

FIG. 9 is a perspective view showing a part of the stator core 42 according to a second example embodiment of the invention. In the second example embodiment, circumferential positions of the protrusions 53 that are formed on the outer peripheral face of the stator core 42 correspond to the positions at which the teeth 46 are formed. This structure provides the following effects and advantages.

The radial thickness of the stator core 42 is large at the portions where the teeth 46 are formed, and thus the rigidity of the stator core 42 is high at these portions. Therefore, the stator core 42 is hard to deform radially at these portions. Accordingly, forming the protrusions at the circumferential positions corresponding to the portions where the teeth 46 are formed provides the advantage that the fit portion 25 bears a sufficiently large press-fit load of the stator core 42. Further, because the protrusions 53 are formed at the portions where the density of magnetic flux at the resolver stator 12 is relatively low, a decrease in the detection signal level, which may be caused as a result of forming the protrusions 53, is minimized.

Figure 10:
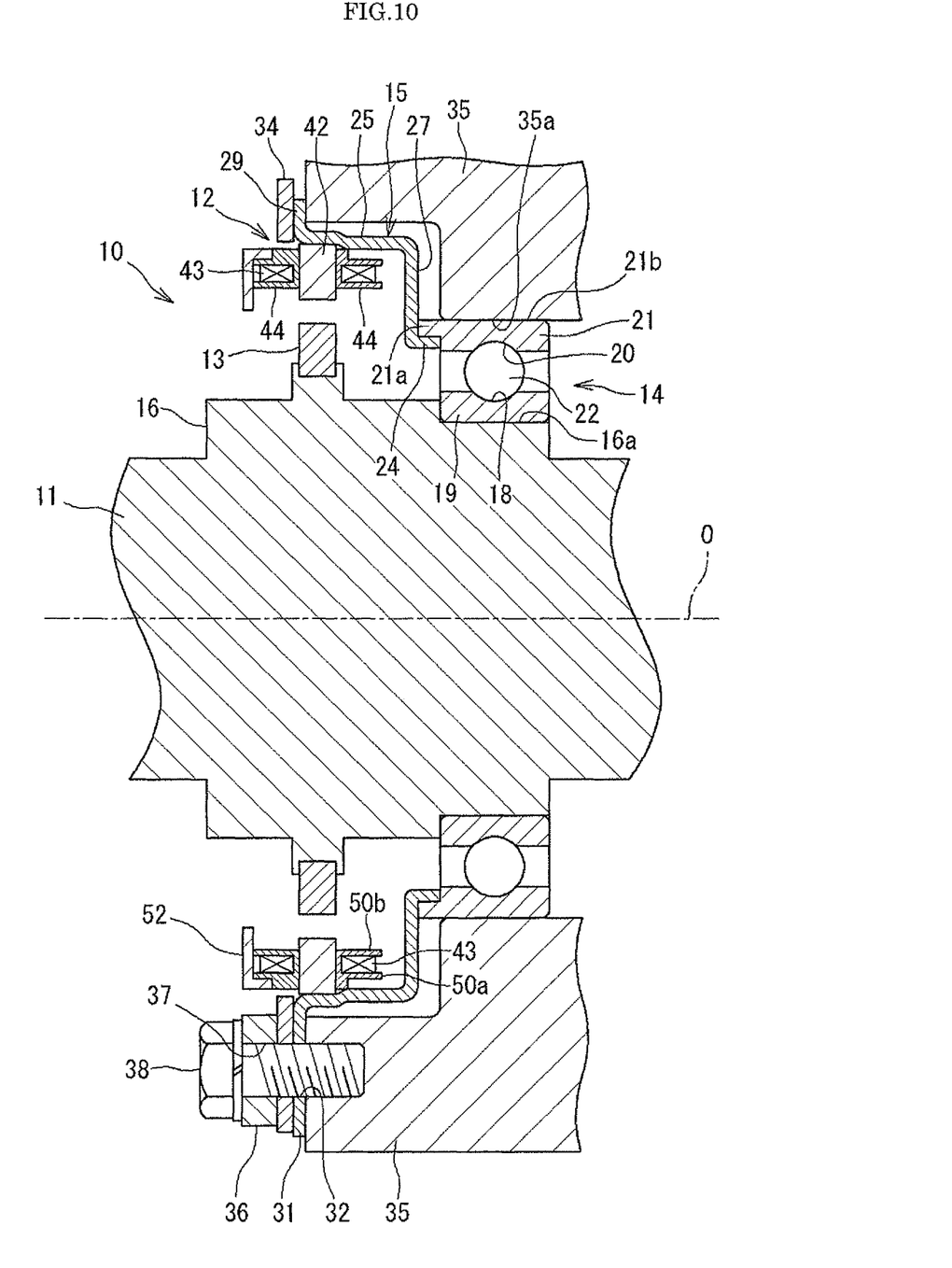
FIG. 10 is a sectional side view showing a resolver according to a third example embodiment of the invention.

FIG. 10 is a sectional side view showing the resolver according to a third example embodiment of the invention. The outer ring attachment portion 24 of the case member 15 of the resolver 10 of the third example embodiment is axially shorter than the outer ring attachment portion 24 of the ease member 15 of the resolver 10 according to the first example embodiment, and any inner rib portion, such as the inner rib portion 28 in the first example embodiment (refer to FIG. 1), is not formed at the axial end of the outer ring attachment portion 24 in the third example embodiment. On the other hand, an attached portion 21a protruding axially is formed at the axial end (the left end as viewed in FIG. 10) of the outer ring 21 of the rolling bearing 14. The attached portion 21a is cylindrical. The outer diameter of the attached portion 21a is substantially equal to that of the outer ring 21, but the inner diameter of the attached portion 21a is larger than that of the outer ring 21. The outer ring attachment portion 24 is fitted, at its outer peripheral face, to the inner peripheral face of the attached portion 21a. Thus, the outer ring 21 is fixed to the case member 15.

The outer ring 21 has an outer peripheral face (fitted portion) 21b that is fitted to the inner peripheral face of a cylindrical support portion 35a formed at the housing 35. Thus, in the third example embodiment, the outer ring 21 is fixed to the housing 35 by being directly fitted to the housing 35 in addition to by being fitted at the flange portion (attachment portion) 31 to the case member 15 to which the outer ring 21 is attached. Accordingly, the rolling bearing 14 is more securely fixed to the housing 35, and thus the rolling bearing 14 more stably supports the rotational shaft 11.

In a case where the housing 35 is made of a material (e.g., aluminum alloy) of which the linear expansion coefficient is larger than that of the outer ring 21, the housing 35 thermally expands more than the outer ring 21 does under a high-temperature environment, which reduces the interferences of the outer ring 21 against the cylindrical support portion 35a. Even in such a case, however, because the outer ring 21 is fixed to the housing 35 via the case member 15, the outer ring 21 no longer runs idle in the cylindrical support portion 35a.

The outer ring attachment portion 24 is axially offset from the fit portion 25. This reduces the mutual interferences between the fitting of the outer ring attachment portion 24 to the attached portion 21a of the outer ring 21 and the fitting of the resolver stator 12 to the fit portion 25. Further, the annular plate portion 27 is formed between the fit portion 25 and the outer ring attachment portion 24. This further reduces the mutual interferences between the fitting of the outer ring attachment portion 24 to the attached portion 21a and the fitting of the resolver stator 12 to the fit portion 25. For example, even when a distortion or the like occurs at the outer ring attachment portion 24 due to fitting of the outer ring attachment portion 24 to the attached portion 21a of the outer ring 21, the fit portion 25 is less likely to be affected by the distortion or the like. Thus, the clearance between each tooth 46 of the resolver stator 12 and the resolver rotor 13 does not become inappropriate, that is, the clearances between the resolver rotor 13 and the respective teeth 46 of the resolver stator 12 are kept appropriate.

Figure 11:
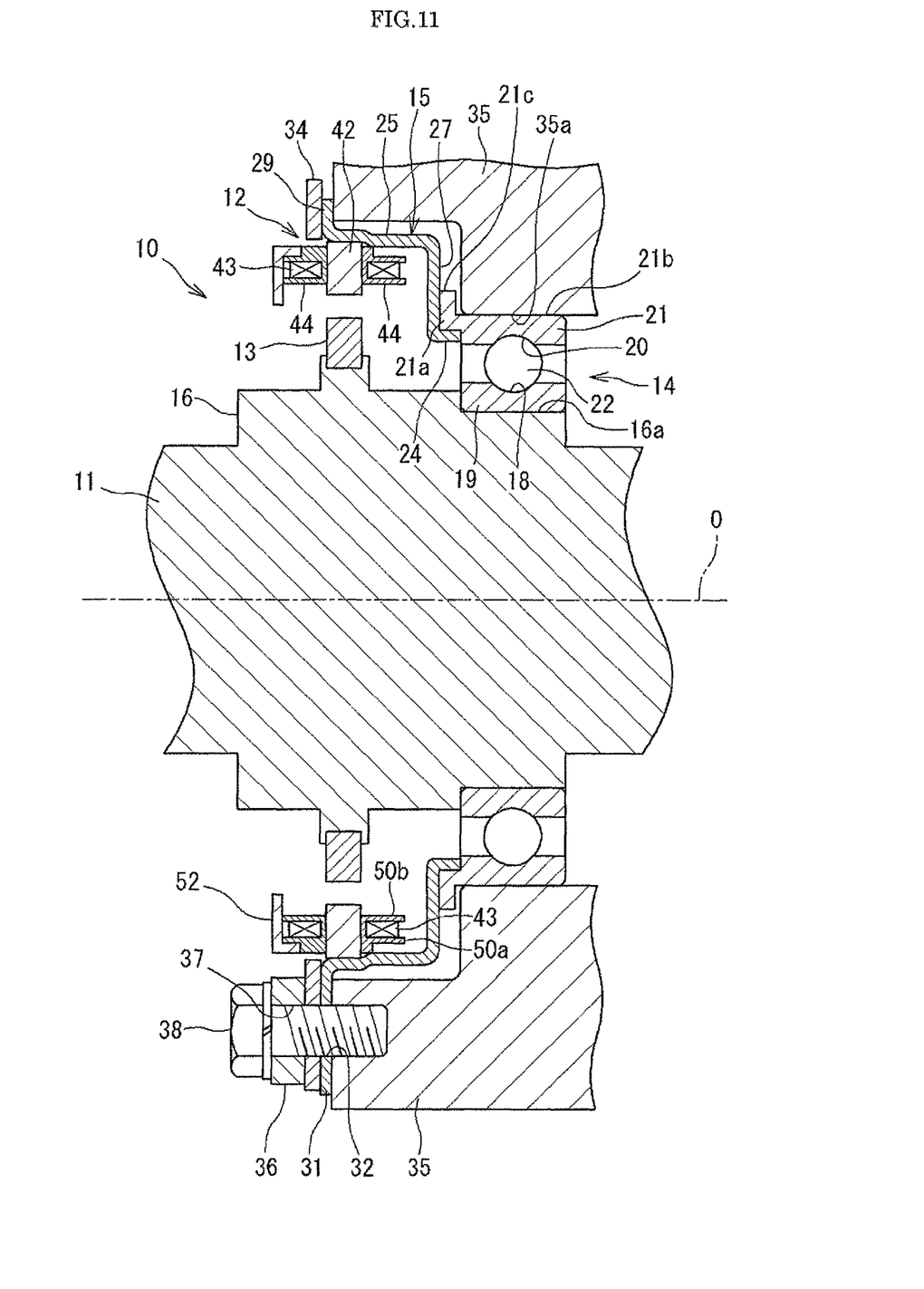
FIG. 11 is a sectional side view showing a resolver according to a fourth example embodiment of the invention.

FIG. 11 is a sectional side view showing the resolver according to a fourth example embodiment of the invention. The structure of the resolver 10 according to the fourth example embodiment is substantially the same as the structure of the resolver 10 according to the third example embodiment, but it is different from the resolver 10 according to the third example embodiment in that a rib portion 21c protruding radially outward from the outer peripheral face 21b of the outer ring 21 is formed at the attached portion 21a formed at the outer ring 21 of the rolling bearing 14. The rib portion 21c increases the rigidity of the attached portion 21a, which allows the attached portion 21a to bear a sufficiently large press-fit load of the outer ring attachment portion 24 against the attached portion 21a (i.e., the load with which the attached portion 21a fastens the outer ring attachment portion 24). Thus, the rolling bearing 14 more stably supports the rotational shaft 11.

While the invention has been explained in conjunction with the specific exemplary embodiments thereof, it is evident that there are various changes that may be made without departing from the scope of the invention defined in the claims. For example, while the number of the protrusions 53 formed at the resolver stator 12 is eight, that is, the number of the protrusions 53 is equal to the number of the teeth 46 in the foregoing example embodiments, the number of the protrusions 53 may either be larger or smaller than the number of the teeth 46 as long as the resolver stator 12 is properly press-fitted to the fit portion 25. However, it is to be noted that at least three protrusions 53 are required to stably fit the resolver stator 12 to the fit portion 25.

If the number of the protrusions 53 is different from the number of the teeth 46, preferably, the number of the protrusions 53 and their positions are set such that the teeth 46 are evenly affected by press-fitting of the protrusions 53 to the fit portion 25, for example, such that the radial displacements of the respective teeth 46, which are caused by press-fitting of the protrusions 53 to the fit portion 25, are uniform. For example, in a case where each protrusion 53 is formed at a position corresponding to the position between the consecutive teeth 46 as in the first example embodiment, preferably, the multiple protrusions 53 are formed at positions symmetrical with respect to the axis O. In a case where the protrusions 53 are formed at the circumferential positions corresponding to the portions where the respective teeth 46 are formed as in the second example embodiment, preferably, the number of the protrusions 53 for the teeth 46 on which the SIN output coils 43 are wound and the number of the protrusions 53 for the teeth 46 on which the COS output coils 43 are wound are equal to each other, and the protrusions 53 for the teeth 46 on which the SIN output coils 43 are wound and the protrusions 53 for the teeth 46 on which the COS output coils 43 are wound are formed at positions symmetrical with respect to the axis O.

The number of the teeth 46 of the resolver stator 12, the shape of each tooth 46, the shape of the resolver rotor 13, etc. are not limited to those in the foregoing example embodiments, may be changed according to various known structures, for example.

According to the invention, it is possible to attach the resolver stator to the case member with almost no influence of the distortion or the like of the case member, and thus it is possible to set an appropriate clearance between each tooth of the resolver stator and the resolver rotor.

What is claimed is:

1. A resolver comprising:
   a resolver rotor attached to a rotational shaft;
   an annular resolver stator that is provided on a radially outer side of the resolver rotor and that has a plurality of teeth each opposed, across a clearance, to an outer peripheral face of the resolver rotor and circumferentially arranged at given intervals; and
   a case member having a cylindrical fit portion to which an outer peripheral face of the resolver stator is fitted, wherein
   at least three protrusions, each protruding radially outward, are formed at given circumferential intervals on the outer peripheral face of the resolver stator, so that the outer peripheral face of the resolver stator is press-fitted to an inner peripheral face of the fit portion at positions at which the protrusions are formed; and
   a rib is formed on the outer pheripheral face of the fit portion, the rib extending radially outward from the outer peripheral face of the fit portion, and wherein the rib is formed by bending an axial end portion of the fit portion.

2. The resolver according to claim 1, wherein
   the protrusions are each formed at a circumferential position corresponding to a position between the consecutive teeth of the resolver stator.

3. The resolver according to claim 1, wherein
   the protrusions are formed at circumferential positions corresponding to portions where the teeth of the resolver stator are formed.

4. A resolver-rolling bearing unit, comprising:
   the resolver according to claim 1; and
      a rolling bearing that has an inner ring, an outer ring, and rolling elements rollably interposed between the inner ring and the outer ring, and that rotatably supports the rotational shaft,
      wherein the case member of the resolver has an outer ring attachment portion to which the outer ring of the rolling bearing is attached, and
      wherein the resolver stator and the rolling bearing are assembled together via the case member into one unit.

5. The resolver-rolling bearing unit according to claim 4,
   wherein the outer ring attachment portion is cylindrical and is different in diameter from the fit portion, and an outer peripheral face of the outer ring of the rolling bearing is press-fitted to an inner peripheral face of the outer ring attachment portion, and
   wherein an annular plate portion which extends radially is formed between the outer ring attachment portion and the fit portion.

6. The resolver-rolling bearing unit according to claim 5, wherein the outer ring attachment portion, the fit portion, and the annular plate portion are foamed by subjecting a single plate to plastic forming process.

7. The resolver-rolling bearing unit according to claim 4,
   wherein the outer ring attachment portion is cylindrical, and is formed at a position axially offset from the fit portion, and
   wherein the outer ring has an attached portion to which an outer peripheral face of the outer ring attachment portion is press-fitted.

8. The resolver-rolling bearing unit according to claim 7,
   wherein the outer ring attachment portion is cylindrical and is different in diameter from the fit portion, and
   wherein an annular plate portion which extends radially is formed between the outer ring attachment portion and the fit portion.

9. The resolver-rolling bearing unit according to claim 7, wherein the attached portion has a rib portion protruding radially outward.

10. The resolver-rolling bearing unit according to claim 8, wherein the attached portion has a rib portion protruding radially outward.

11. The resolver-rolling bearing unit according to claim 7, wherein the case member has an attachment portion for a housing of a device having the rotational shaft, and a fitted portion is formed at the outer peripheral face of the outer ring, the fitted portion being press-fitted to an inner peripheral face of the housing.

12. The resolver-rolling bearing unit according to claim 8, wherein the case member has an attachment portion for a housing of a device having the rotational shaft, and a fitted portion is formed at the outer peripheral face of the outer ring, the fitted portion being press-fitted to an inner peripheral face of the housing.

13. The resolver-rolling bearing unit according to claim 9, wherein the case member has an attachment portion for a housing of a device having the rotational shaft, and a fitted portion is formed at the outer peripheral face of the outer ring, the fitted portion being press-fitted to an inner peripheral face of the housing.

14. The resolver-rolling bearing unit according to claim 10, wherein the case member has an attachment portion for a housing of a device having the rotational shaft, and a fitted portion is formed at the outer peripheral face of the outer ring, the fitted portion being press-fitted to an inner peripheral face of the housing.

15. A resolver-rolling bearing unit, comprising:
   a resolver comprising:
      a resolver rotor attached to a rotational shaft;
      an annular resolver stator that is provided on a radially outer side of the resolver rotor and that has a plurality of teeth each opposed, across a clearance, to an outer peripheral face of the resolver rotor and circumferentially arranged at given intervals; and
      a case member having a cylindrical fit portion to which an outer peripheral face of the resolver stator is fitted, wherein at least three protrusions, each protruding radially outward, are formed at given circumferential intervals on the outer peripheral face of the resolver stator, so that the outer peripheral face of the resolver stator is press-fitted to an inner peripheral face of the fit portion at positions at which the protrusions are formed; and a rolling bearing that has an inner ring, an outer ring, and rolling elements rollably interposed between the inner ring and the outer ring, and that rotatably supports the rotational shaft, wherein the case member of the resolver has an outer ring attachment portion to which the outer ring of the rolling bearing is attached, and wherein the resolver stator and the rolling bearing are assembled together via the case member into one unit.

16. The resolver-rolling bearing unit according to claim 15, wherein the outer ring attachment portion is cylindrical and is different in diameter from the fit portion, and an outer peripheral face of the outer ring of the rolling bearing is press-fitted to an inner peripheral face of the outer ring attachment portion, and wherein an annular plate portion which extends radially is formed between the outer ring attachment portion and the fit portion.

17. The resolver-rolling bearing unit according to claim 16, wherein the outer ring attachment portion, the fit portion, and the annular plate portion are formed by subjecting a single plate to plastic forming process.

18. The resolver-rolling bearing unit according to claim 15, wherein the outer ring attachment portion is cylindrical, and is formed at a position axially offset from the fit portion, and wherein the outer ring has an attached portion to which an outer peripheral face of the outer ring attachment portion is press-fitted.

19. The resolver-rolling bearing unit according to claim 18, wherein the attached portion has a rib portion protruding radially outward.

20. The resolver-rolling bearing unit according to claim 18, wherein the case member has an attachment portion for a housing of a device having the rotational shaft, and a fitted portion is formed at the outer peripheral face of the outer ring, the fitted portion being press-fitted to an inner peripheral face of the housing.

* * * * *